Sept. 11, 1945.  M. P. ANDERSON  2,384,719
GREENHOUSE CONSTRUCTION
Filed June 3, 1943  3 Sheets-Sheet 1

Inventor.
Mads Peter Anderson
by Heard Smith & Tennant
Attys.

Sept. 11, 1945.  M. P. ANDERSON  2,384,719
GREENHOUSE CONSTRUCTION
Filed June 3, 1943  3 Sheets-Sheet 2
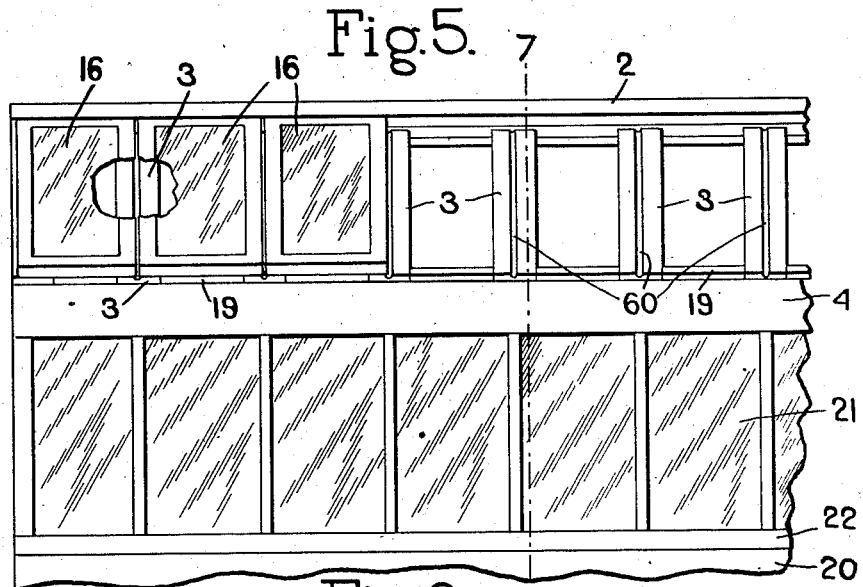
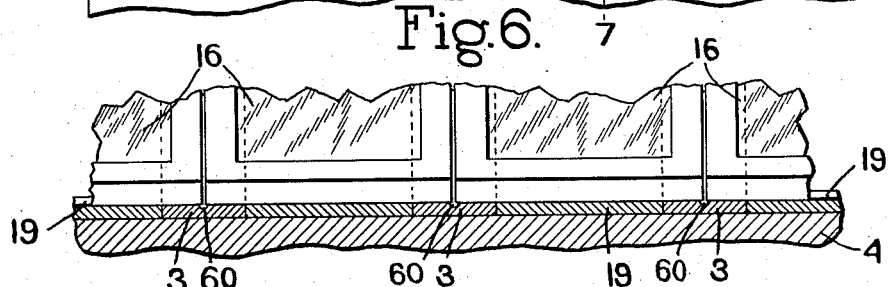
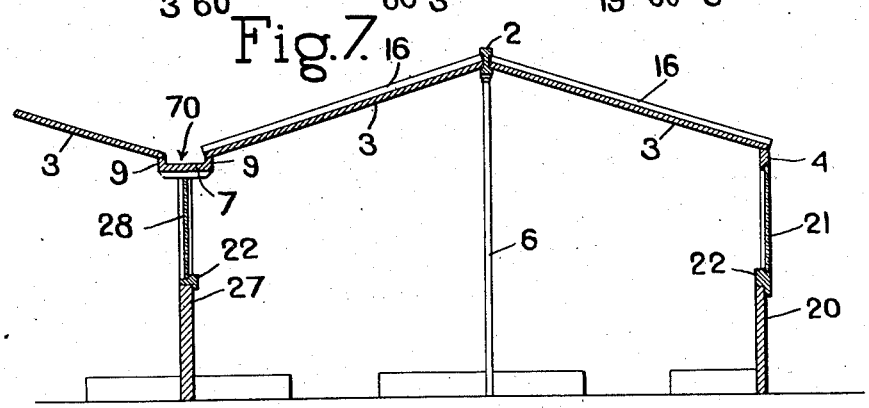
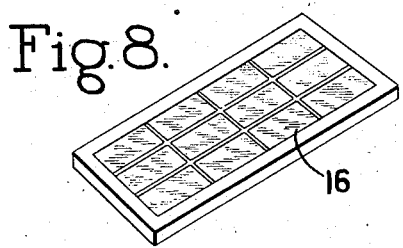
Inventor.
Mads Peter Anderson
by Heard Smith & Tennant.
Attys.

Sept. 11, 1945.    M. P. ANDERSON    2,384,719
GREENHOUSE CONSTRUCTION
Filed June 3, 1943    3 Sheets-Sheet 3
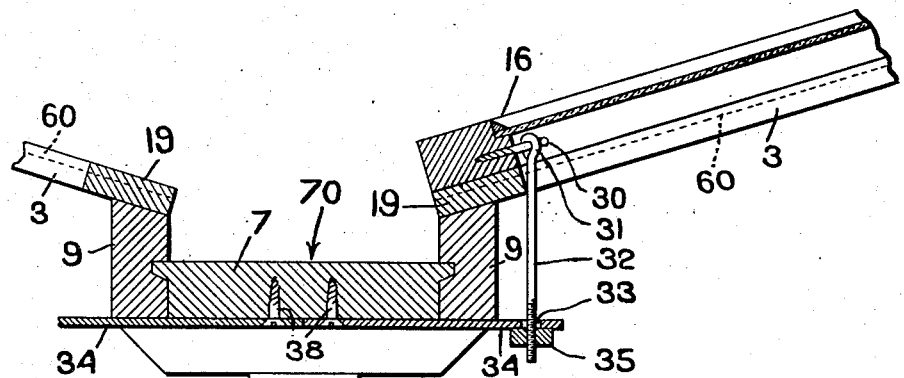
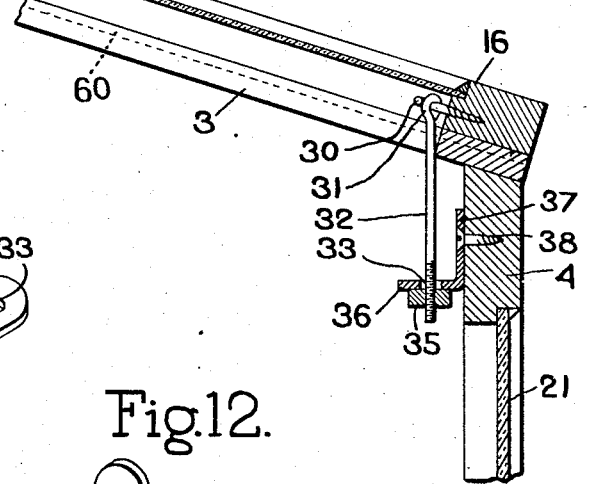
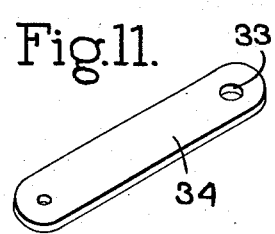
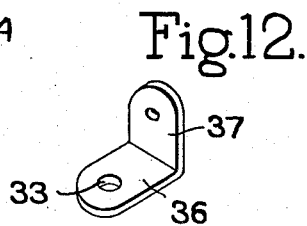
Inventor.
Mads Peter Anderson
by Heard Smith & Tennant
Attys.

Patented Sept. 11, 1945

2,384,719

UNITED STATES PATENT OFFICE 2,384,719

GREENHOUSE CONSTRUCTION

Mads Peter Anderson, Woburn, Mass.

Application June 3, 1943, Serial No. 489,487

2 Claims. (Cl. 108—1)

This invention relates to greenhouse construction and operation.

Greenhouses are frequently built in three or more similar sections, each section being used for growing some particular crop different from that grown in the other sections.

Some crops, such for instance as gladiolus, which, in northern latitudes are usually started in the early spring in the greenhouse in order to get an early crop, will grow to maturity much more satisfactorily in an outdoor field instead of in a greenhouse. The gladiolus which mature in the open field are more sturdy and have better lasting qualities than those which grow to maturity in a greenhouse. Experience has shown, however, that transplanting gladiolus from a greenhouse to an open field produces unsatisfactory results and so the common practice is either to start the bulbs and grow them to maturity in a greenhouse for an early crop, or to set the bulbs in an open field where they are grown to maturity for a later crop.

There are other crops, such as chrysanthemums, which are brought to maturity late in the season after the cold weather has come, and it is necessary, therefore, that such crops should be in the greenhouse at least during the latter part of their growing season, although such a crop does not require greenhouse conditions for its early growth during the summer I have herein shown my invention as embodied in a greenhouse construction having three separate sections for growing three different crops and which is provided with removable roof sash sufficient in quantity to cover one section only, which roof sash can be transferred from one section to another as conditions require, thus enabling all three crops to be grown satisfactorily during any season by using only an amount of roof sash sufficient to cover one of the sections.

The roof is one of the expensive items in greenhouse construction, and by operating a greenhouse that is built in sections with only sufficient roof glass to cover one of the sections, not only is the initial expense of the greenhouse reduced, but the expense of operation is correspondingly reduced, since the roof of a greenhouse is the part thereof that is most likely to be damaged by storms.

In a greenhouse herein shown, the roof is composed of removable roof sash, and in operating the greenhouse the roof sash will be placed on one section thereof in the late winter or early spring, and said section may be planted to gladiolus or some other crop which will mature best in an open field. This crop will thus get its initial growth under greenhouse condition. By the latter part of April or the first of May, the gladiolus or other crop will be sufficiently developed so that further growth will be more satisfactory if it takes place in an open field. At this time the roof sash may be removed from the section of the greenhouse containing the gladiolus crop and placed on a second section in which some crop, such as cucumbers, is being grown which develops better throughout the summer months under greenhouse growing conditions. During this time that the roof sash is being used on the section in which the second crop such as cucumbers is being grown, the other or third section of the greenhouse, which at such time has no roof glass, may be planted to chrysanthemums or some late maturing crop. By the time the cucumber crop has been harvested, the chrysanthemum crop will have been developed to a point where further growth is best produced under greenhouse conditions, and the roof sash can then be removed from the second section and placed on the third section containing the chrysanthemum crop where it will remain until the crop has been brought to maturity.

The same roof sash can thus be used in connection with the growing of three different crops, and it is unnecessary to transplant any crop during its growth, because the sash can be used in the spring in connection with the crop that has to be started early in a greenhouse and will be successfully brought to maturity in the open air, and the same sash may also be used in connection with the crop which is started in the open air but is to be brought to maturity in the late fall under greenhouse conditions, and between the spring and fall when the roof sash is not required for either of the above two crops, it can be used on the third section of the greenhouse for growing and maturing some crop like cucumbers.

When the roof sash is entirely removed from any section of the greenhouse, the atmospheric conditions existing in said section will, for all practical purposes, be identical with those existing out of doors, and any plants growing in the section with the roof sash removed will develop just as satisfactorily as they would in an open field.

While reference has been made above to some specific crops such as gladiolus, cucumbers, and chrysanthemums, yet I wish it to be understood that the invention is not limited to the growing of these particular crops but is applicable for use in growing other crops, some of which require to be grown under greenhouse constructions in the spring, some of which require to be grown under greenhouse constructions in the fall, and others of which do well when grown under greenhouse conditions during the summer. One of the objects of the invention is to provide a greenhouse adapted to be operated in the manner above described and which includes various novel features which will be pointed out in the appended claims.

In order to give an understanding of my invention, I have illustrated in the drawings a selected embodiment thereof which will now be described after which the novel features will be pointed out in the appended claims.

In the drawings:

Fig. 5 is a fragmentary side view of a greenhouse embodying my invention.

Fig. 6 is a section on the line 6, Fig. 2.

Fig. 7 is a transverse section through one section of the greenhouse.

Fig. 8 is a perspective view of one of the removable roof sashes.

Figs. 9 and 10 are fragmentary sectional views showing means for anchoring the removable roof sash to the frame.

Figs. 11 and 12 are perspective views of anchoring plates which may be used in connection with anchoring the removable sash to the roof.

Figure 1:
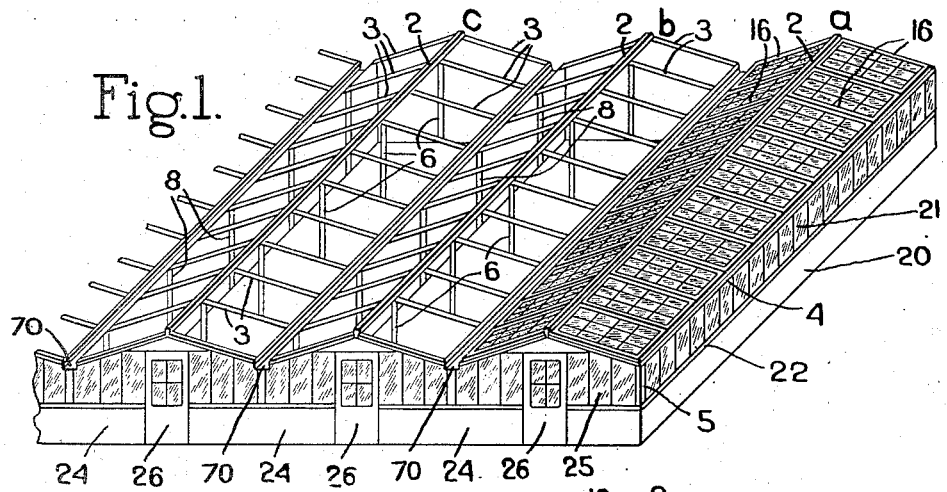
Fig. 1 is a perspective view of a greenhouse having three sections embodying my invention.

In Fig. 1, there is shown a greenhouse having the three sections a, b, and c, said sections being joined together. The frame of each section comprises a ridge pole element 2 extending longitudinally of the section and supported on a plurality of posts 6, and rafters 3 secured at their upper ends to the ridge pole and extending outwardly and downwardly therefrom. At the outer side of the section a the outer ends of the rafters are supported by and secured to a plate element 4 which runs longitudinally of the greenhouse and is supported by suitable posts (not shown).

The frame of the greenhouse is formed with a gutter 70 between adjacent sections. This gutter is made with a base or floor member 7 which is supported on suitable posts 8 and vertically extending side members 9 which are joined to the edges of the floor member 7 with a watertight joint, the upper edges of the side members being beveled. The outer ends of the rafters 3 on the side of the roof adjacent the gutter rest on and are secured to the beveled upper edges of the side portions 9 of the gutter.

Each ridge pole element 2 is provided with a sash-receiving groove 10 in each side thereof which extends throughout its full length. While the ridge pole element may be made in various ways, yet I have herein shown it as comprising a central member 11 which rests on the posts 6, two rafter-supporting strips 12 secured to the central member 11 on each side thereof and a cap or header element 13 secured to the top of the central member. Each rafter-supporting strip 12 is provided with an upwardly facing shoulder 14 on which the upper end of the rafters rest, said rafters being nailed or otherwise secured to the strip. The header or cap piece 13 has a transverse dimension considerably greater than the thickness of the central member 11, thereby providing overhanging edges 15. Each rafter has a flat upper face extending from one side edge thereof to the other and broken only by a centrally located longitudinally extending drainage groove 60.

The roof of each section is completed with a plurality of removable roof sashes 16 such as illustrated in Fig. 8, each sash being fully glazed.

Figure 2:
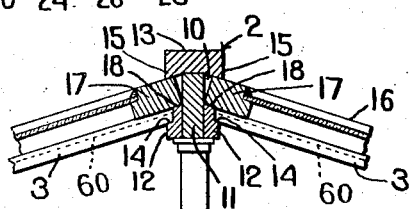
Fig. 2 is a fragmentary vertical transverse sectional view through one section with parts broken out.

When each sash is in position, it rests on two adjacent rafters 3, and the upper end 17 of the sash is received within the sash-receiving groove 10 as shown in Fig. 2. When in this position the overhanging edge 15 of the header overlies the top face of the sash and thus makes a tight joint. Each roof sash 16 is of a length to extend from the ridge pole to either the plate 4 or the gutter, and when the roof sash are all in place, the roof is entirely closed, as shown in Fig. 1 with respect to section a.

These roof sash merely rest on the rafters and each sash can be readily removed from the roof or replaced thereon.

The rafter-supporting strips 12 are preferably formed with a beveled upper face 18 on which the upper edge of the roof sash rest. The sides of the roof sash rest on the rafters 3, and the rafters in turn rest at their lower ends on and are secured to either the plate 4 or the side 9 of the gutter. In order to make a tight joint at the lower end of the sash, I propose to employ filling pieces 19 between the adjacent rafters, said filling pieces having the same thickness as the rafters and resting on and being secured to either the plate 4 of the side piece 9 of the gutter. The lower ends of the roof sash thus rest on the rafters and on the filling pieces 19. Since the rafters have flat upper faces devoid of any parting strip, the adjacent edges of any two adjacent sashes are in close proximity to each other, and the jonnt between such adjacent sash is directly over and registers with the groove 60 in the corresponding rafter, so that any water which seeps through the joint will be caught by said groove and thus drained off.

The side and end walls of the greenhouse may have any suitable or usual construction. I have herein shown the outside wall of section a as boarded up for part of its vertical dimension as indicated at 20, the portion of the side wall above the boarded portion 20 being glazed. Between the boarded section 20 and the glazed section 21, there is a stringer or girder 22 which is secured to the boarded section 20 and is formed to receive the lower edges of the glass 23 of the glazed section.

The lower portion 24 of the end walls of the greenhouse section are shown as boarded up, and the upper portion 25 thereof as being glazed. Each end section may be provided with the usual door 26.

Where the three sections a, b, and c are to be used independently, I propose to place a suitable partition 27 between the various sections which may have an desirable construction but which will preferably have the upper portion 28 thereof glazed.

Since these roof sash 16 merely rest loosely on the rafters and are removable, they can be readily removed from the roof of any section of the greenhouse and transferred to the roof of another section. If it is assumed that section a of the greenhouse is used for growing plants, such as gladiolus, that should be started early in the spring in order that they may come to maturity during the summer, and that mature best and most satisfactorily in an open field, then the roof of section a of the greenhouse will be equipped with the roof sash in the early spring and the crop started at the proper time. When the crop in section a has grown to a point where it will develop more satisfactorily in an open field, then the roof sash may be removed entirely from the section a of the greenhouse and if desired transferred to one of the other sections. When the sash has been thus removed, the conditions existing in section a of the greenhouse will be substantially identical with those out of doors thus giving the crop in section a the full benefit of growing in an open field.

The section b of the greenhouse may have therein a crop, such as cucumbers, which can be best grown during the summer in a greenhouse, and by transferring the roof sash from section a to section b, the desired growing conditions in both sections a and b can be secured. The section c may have therein a crop (such as chrysanthemums) which can very satisfactorily be started out of doors but will not be fully matured until the outdoor growing season has passed. In such case, the roof sash 16 can be transferred from section b after the crop therein has matured to section c where it will be used to secure in section c the desired greenhouse conditions for the late maturing crop.

It will thus be seen that with my invention, it is possible to operate a greenhouse with the use of an amount of roof sash sufficient to cover only a part or one section of the entire roof area, and it is also possible to secure in any section either greenhouse atmospheric conditions by using the roof sash on said section, or growing conditions identical with those in an open field by removing entirely the roof sash from the section.

It is the roof of a greenhouse which is most likely to be damaged by storms, and by operating the greenhouse with an amount of glass roof sufficient to cover only one-third or a fraction of the entire roof, the amount of liability of damage from a storm is thereby greatly reduced. Furthermore, the initial cost of erecting a greenhouse embodying my invention is considerably less than that involved in building an ordinary greenhouse with a permanent roof because it is necessary to use an amount of roof sash sufficient to cover one section only.

While I have described the removable roof sash 16 as resting loosely on the rafters, yet if it is desired to temporarily anchor such roof sash to the roof to prevent its being lifted by high winds, the construction shown in Figs. 9 and 10 may be employed, wherein the lower rail of each roof sash has an anchoring stud 30 secured thereto and extending from the inner face thereof substantially parallel to the glass and which is adapted to be detachably engaged by the eye 31 of an eye bolt 32, the lower end of which extends through an opening 33 formed in an anchoring plate 34 that is attached to the underside of the gutter 70. This eye bolt 32 has a nut 35 screwthreaded thereto, by tightening which the sash will be clamped tightly against the rafter.

For the sash on the outside I may use an L-shaped anchoring member 36 to which the eye bolt 32 is anchored, this L-shaped member having one leg 37 thereof secured to the plate 4 by means of a screw 38, the other leg of said anchoring plate having an enlarged hole 33 through which the lower end of the eye bolt 32 extends.

After the roof sash 16 have been laid on the roof, then the eye bolts may be hung over the anchoring studs 30 with the lower ends of the eye bolts extending through the apertures 33 in the anchoring plates, after which the clamping nuts 35 are applied to the anchoring bolts to clamp the sash firmly against the rafters. When it is desired to remove the sash, the clamping nut 35 may be backed off a sufficient distance to permit the eye bolts to be disengaged from the studs 30, and when this is done, the sash are free to be lifted from the roof.

It will be noted that the studs 30 are set into the inside edge of the lower rail of the sash. An advantage of this construction is that these studs do not project beyond the face of the sash so that when a plurality of sash are piled one on the other, each sash will rest flatly on the sash below it.

The anchoring members 34 and 36 are permanently secured in place, but by making the apertures 33 somewhat larger than the eye bolts 32, said eye bolts can be readily connected to the anchor plates even though the position of the sash on the roof vary somewhat.

Figure 3:
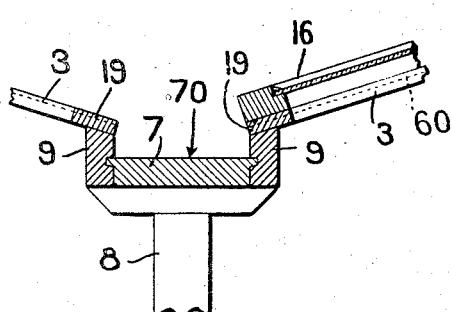
Fig. 3 is a fragmentary side view of the roof of one section in which the roof has a pitch in the direction of its length.
Figure 3:
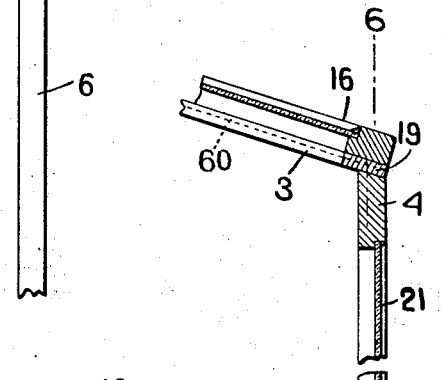
Figure 3:
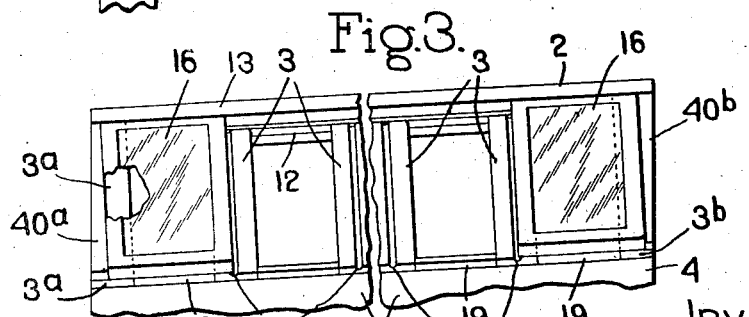
Figure 4:
Fig. 4 is a perspective view of the rafter at one end of the roof.

If it is desired to give the gutters a pitch in the direction of their length, or if the greenhouse is built on ground which slopes slightly from one end to the other of the house, I propose to use specially constructed rafters at each end in order that the end walls of the greenhouse may be perpendicular. Fig. 3 is a fragmentary side view of the roof of a greenhouse which pitches from the right toward the left. In building this greenhouse, each rafter 3a at the lefthand or lower end of the greenhouse will have attached thereto at its outer edge a positioning strip 40a which is wider at the bottom than at the top and against which the side edge of the end roof sash 16 abuts. The rafter 3b at the other or upper end of the greenhouse will have a similar positioning strip 40b secured to its outer edge which, however, is wider at the top than at the bottom. The relative widths of each of these positioning strips 40a and 40b at their opposite ends will be determined by the pitch which the roof is to have, but in any case, the varying width of each positioning strip will be such that the end walls of the greenhouse will be vertical notwithstanding the pitch which the roof of the building may have. This is clearly illustrated in Figs. 3 and 4.

I claim:

1. A greenhouse having two parallel roof sections, each having a ridge pole, a gutter between said sections common to both of them, said gutter presenting a floor member and an upstanding side member on each side of the floor member, each side member having a beveled upper edge, rafters supported at their upper ends on the ridge pole and at their lower ends on the beveled upper edges of the side members, each rafter having a flat top surface extending from one side edge to the other and broken only by a centrally located longitudinally extending drain groove, filling pieces secured to the upper edges of the side members between adjacent rafters, the upper faces of the filling pieces being flush with the flat upper faces of the rafters, and a plurality of separate roof sash resting on the rafters and each extending from the ridge pole to the gutter, the lower ends of the removable sash resting on the filling pieces.

2. In greenhouse construction, a frame comprising a ridge pole presenting a central ridge pole member, a rafter-supporting strip secured to said central member on each side thereof and a cap element secured to the top of the central member and extending laterally beyond the sides thereof, each rafter-supporting strip having a beveled sash-supporting top face and an upwardly directed rafter-supporting shoulder below said top face, rafters having their upper ends resting on the said upwardly facing shoulder and each having a flat upper sash-receiving surface extending from one side edge to the other and broken only by a longitudinally extending centrally located drainage groove, rafters having their upper ends resting on said upwardly facing shoulder, said cap element of the ridge pole forming with the top surface of said strips a sash-receiving groove, a plurality of separate roof sash removably supported on the rafters and having their upper ends resting on the top faces of said strip and received in said sash-receiving groove.

MADS PETER ANDERSON